Nov. 23, 1971 W. R. KENDALL 3,621,742
IRRADIATED FUEL PROCESSING SYSTEM
Filed March 25, 1968 15 Sheets-Sheet 1

INVENTOR:
WYVIL R. KENDALL

BY *John R Duncan*
ATTORNEY

United States Patent Office 3,621,742
Patented Nov. 23, 1971

3,621,742
IRRADIATED FUEL PROCESSING SYSTEM
Wyvil R. Kendall, San Jose, Calif., assignor to
General Electric Company
Filed Mar. 25, 1968, Ser. No. 715,602
Int. Cl. B26d 7/04, 7/08
U.S. Cl. 83—42                                27 Claims

ABSTRACT OF THE DISCLOSURE

A system for handling irradiated nuclear reactor fuel bundles preparatory to reprocessing the irradiated fuel contained therein is disclosed. This system includes a fuel bundle clamping table including means to remove bundle end fittings and to clamp the bundle in a fixed position while permitting longitudinal movement of the fuel rods through the bundle; a fuel rod pulling assembly including means for pulling fuel rods from the bundle, for handling the rods and for collecting groups of rods; a shear feed assembly including means to feed groups of fuel rods incrementally to a shear; and a shear assembly including means to simultaneously cut two small pieces from the end of each rod of a set with each shearing stroke. A process for performing the above-indicated operations is also disclosed. This system is simple, reliable and capable of being remotely operated, disassembled and modified.

BACKGROUND OF THE INVENTION

Nuclear steam generating plants, utilizing heat produced by nuclear fission reactions in a nuclear reactor are now well known. In a typical nuclear reactor, fissionable fuel material, such as $UO_2$ including a suitable proportion of U–235, is encased in long tubes of corrosion resistant cladding material, such as stainless steel or zirconium alloy. The ends of the tubular clad members or "rods" are sealed with end plugs or caps. A plurality of these fuel rods are secured in a fixed parallel arrangement by means of spacers at several locations along the bundle length. The bundle is supported by tie plates at each end. Typical fuel bundles are described in detail in U.S. Pat. No. 3,350,275, for example.

A plurality of these fuel bundles together with necessary controls, moderators, reflectors, etc., are arranged in a reactor to make up the reactor core. The fuel bundles are arranged so that a controlled chain nuclear fission reaction may be maintained, producing large quantities of heat. This heat is removed by a coolant which is used to transfer the energy to a load, such as a turbine, where useful work is performed.

As the nuclear reaction proceeds the fissionable material is gradually consumed and the quantity of fission products in the fuel increases until there is insufficient reactivity in the fuel to economically support the nuclear reaction. Then the fuel bundles are removed from the reactor and replaced by other bundles containing fresh fuel. Typically, the irradiated fuel contains valuable amounts of U–235, U–238, Pu–239, Np–237 and others which may be separated from other fission products, for reuse as fuel, for example. Chemical reprocessing systems with which the system of the present invention may be used effectively include those described in U.S. Patents 3,359,078 and 3,222,124. To accomplish this recovery, the irradiated fuel must first be mechanically prepared for subsequent chemical processing.

To permit the solvent to contact the fuel, the cladding around the fuel must be opened. In the past, the entire fuel bundle was cut up by means of a very large shear into small pieces, which were dropped into a dissolver. This shear had to be very large and powerful to cut through tie rods, tie plates, spacers, etc. in addition to cutting through a large number of fuel rods at a single stroke. Since irradiated fuel is highly radioactive, the fuel bundles must be remotely handled. Repair and replacement of worn parts, such as shear blades in the large shearing devices is difficult. Remote handling of irradiated fuel bundles is difficult and has in the past required very complex equipment.

Thus, there is a continuing need for simpler, more reliable and more economical systems for preparing irradiated fuel bundles for chemical reprocessing of the fuel.

SUMMARY OF THE INVENTION

It is, therefore, an object of this invention to provide a system for preparing spent fuel bundles for chemical fuel reprocessing which overcomes the above-noted problems.

Another object of this invention is to provide an improved apparatus for disassembling irradiated nuclear reactor fuel bundles.

Another object of this invention is to provide an improved system for handling, disassembling and shearing irradiated fuel elements.

Another object of this invention is to provide a means to clamp fuel bundles in fixed position while permitting longitudinal movement of fuel rods therein.

Another object of this invention is to provide a system for handling, disassembling and shearing irradiated nuclear fuel elements which is capable of remote operation, disassembly and modification.

Yet another object of this invention is to provide an improved process for preparing irradiated nuclear fuel bundles for chemical reprocessing of the fuel therein.

Still another object of this invention is to provide a process for handling and disassembling irradiated nuclear fuel bundles and for shearing the fuel rods contained therein which may be entirely performed by operators at a remote location.

Still another object of this invention is to provide an improved apparatus for shearing irradiated fuel rods.

A further object of this invention is to provide a shearing apparatus of improved reliability and longer useful life.

A further object of this invention is to provide a shearing apparatus capable of being repaired and having worn parts replaced remotely.

Still another object of this invention is to provide a simple completely remotely operated system for disassembling irradiated fuel bundles, feeding fuel rods to a shear, and shearing the rods into small pieces.

The above objects and others are accomplished in accordance with this invention by a system which includes a remotely operated means for disassembling spent nuclear fuel rod bundles and for shearing the fuel rods into small pieces suitable for chemical fuel reprocessing operations. The fuel bundles are first clamped on a clamp table and the fuel rod end securing means are removed. A fuel rod pulling head pulls individual fuel rods or groups of fuel rods from the bundle. A holding table collects the desired number of fuel rods, then directs them to a shear feed means. The shear feed means feeds groups of fuel rods incrementally into a double-blade shear. The shear simultaneously cuts two small pieces from the end of each fuel rod in the group. The cut pieces fall into a container for chemical reprocessing of the fuel.

The fuel rod bundle disassembly and shearing system can handle a wide variety of fuel rod and bundle configurations. This assembly is easily remotely operated, disassembled, modified or repaired.

BRIEF DESCRIPTION OF THE DRAWING

Details of the invention will be further understood upon reference to the drawing, which show a preferred embodiment of the system of this invention, wherein.

DETAILED DESCRIPTION OF THE INVENTION

Fuel rod reprocessing system

Figure 1:
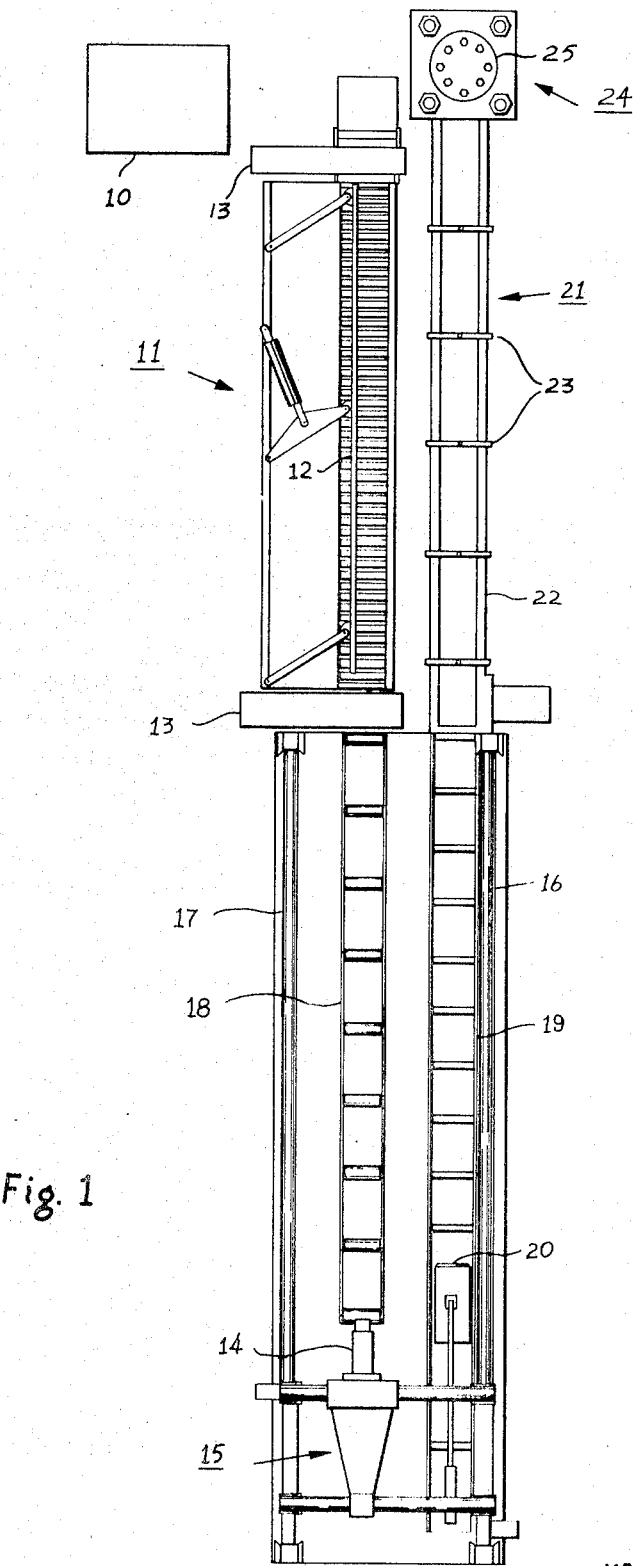
FIG. 1 shows a schematic plan view of the entire fuel disassembly, handling and shearing system.

FIG. 1 shows a simplified overall plan view of the system for disassembling nuclear fuel bundles and shearing the fuel rods into small pieces suitable for chemical reprocessing of the fuel. Details of the system have been omitted from FIG. 1, for clarity. These details are fully shown in the additional figures which follow.

As seen in FIG. 1, bundles containing irradiated fuel rods are stored in an area schematically indicated at 10. From storage area 10, the bundles are carried by a conventional crane (not shown) to a nuclear fuel rod bundle handling means in the form of a clamp table 11. The bundle is positioned on clamp table 11 and held by movable clamp means 12, which engages the bundle shroud, spacers, etc. but leaves the fuel rods free to move longitudinally. Fuel rod end securing means, including end plates, lifting handles, tie rods, etc. are removed by conventional remote manipulation. Typical of the many conventional remote manipulators which may be used in conjunction with the various assemblies of this invention are those described in U.S. Pats. 2,978,118 and 2,632,574. An abrasive saw may also be provided to cut end plates from the fuel bundle, if necessary, within removable hoods 13. After the bundle end fittings are removed, hoods 13 are lifted away.

The bundle is positioned on clamp table 11 in alignment with a nuclear fuel rod bundle disassembly means in the form of a rod pulling assembly. A rod pulling head 14 is mounted on a movable carriage 15 which may be moved along guide rails 16 and 17 to engage fuel rods in a bundle on clamp table 11. Pulling head 14 may be raised and lowered and moved transversely by means described below.

After rod pulling head 14 grasps one or more fuel rods, it is moved back, pulling the rods from the bundle and depositing them onto rollers on receiving table 18.

The fuel rods are transferred to a holding means in the form of a holding table 19. When the desired number have accumulated, pusher 20 pushes them into a feed means in the form of a feed assembly generally designated 21. Shear feed assembly 21 has a cover 22 secured by a plurality of clamps 23. A pusher within shear feed assembly 21 incrementally feeds fuel rods into a shear means in the form of a shear 24. Shear 24 includes a hydraulic cylinder 25 which drives a double-bladed shear to cut two pieces simultaneously from the end of each fuel rod. These pieces drop into a container wherein chemical fuel reprocessing is begun.

This combination of cooperating devices permits the remote disassembly, handling and shearing of highly radioactive irradiated fuel rods. Details of the various sub-assemblies making up this system and of the operation of this system will become further apparent upon reference to the following figures, which detail the various sub-assemblies.

Fuel bundle clamping table

Figure 2:
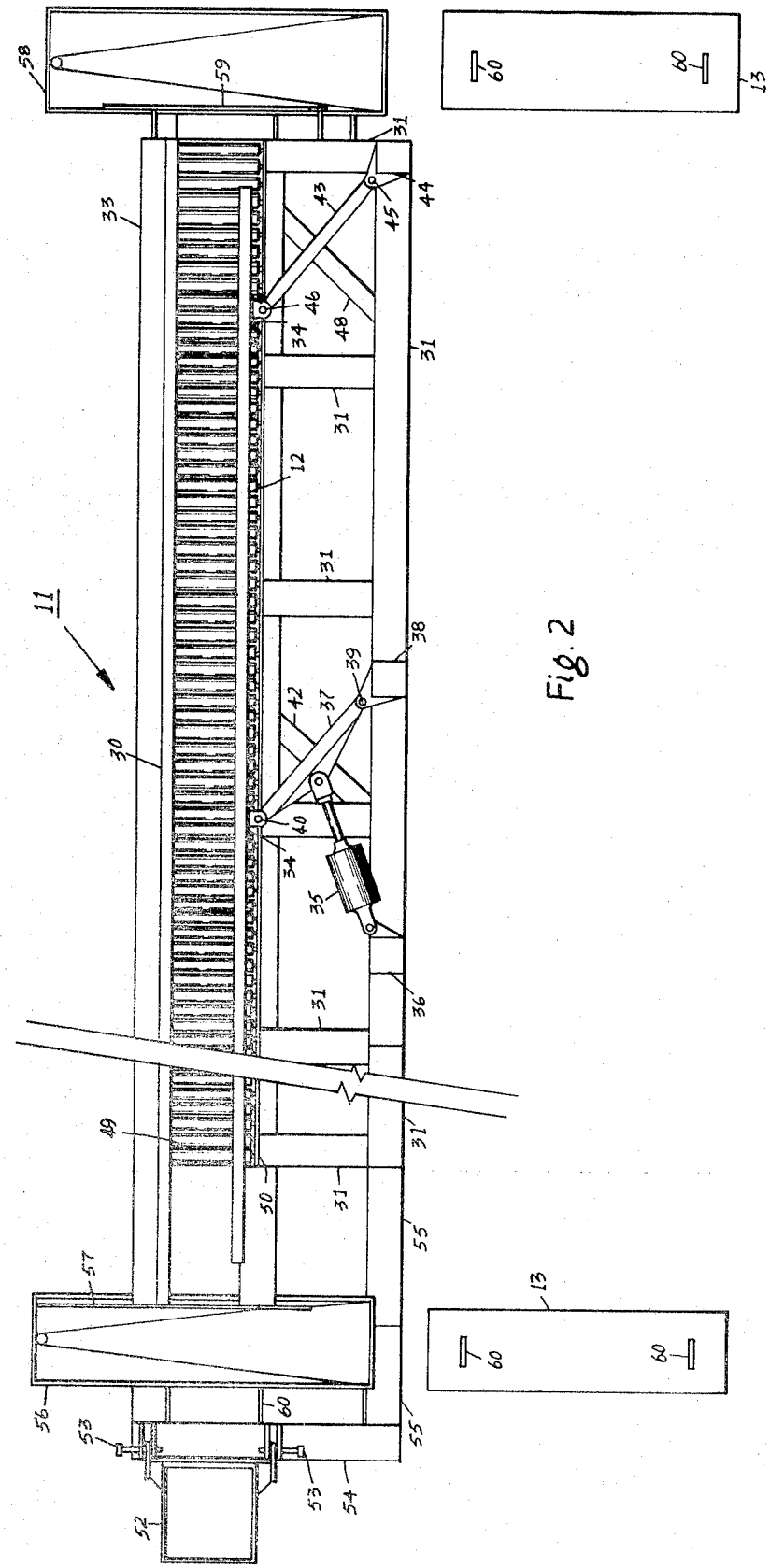
FIG. 2 shows a plan view of the fuel bundle clamping table.
Figure 3:
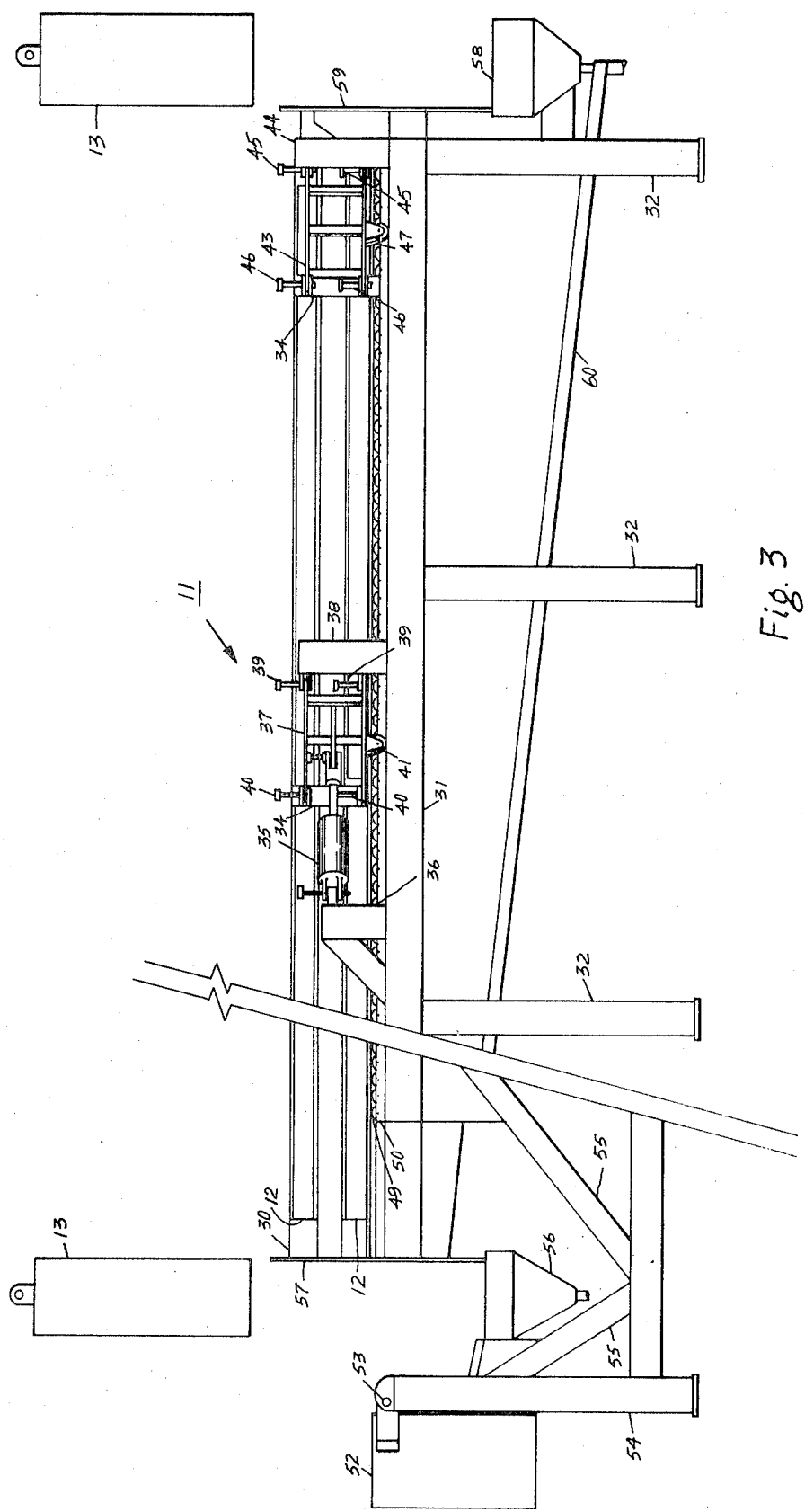
FIG. 3 shows the fuel bundle clamping table in elevation.
Figure 4:
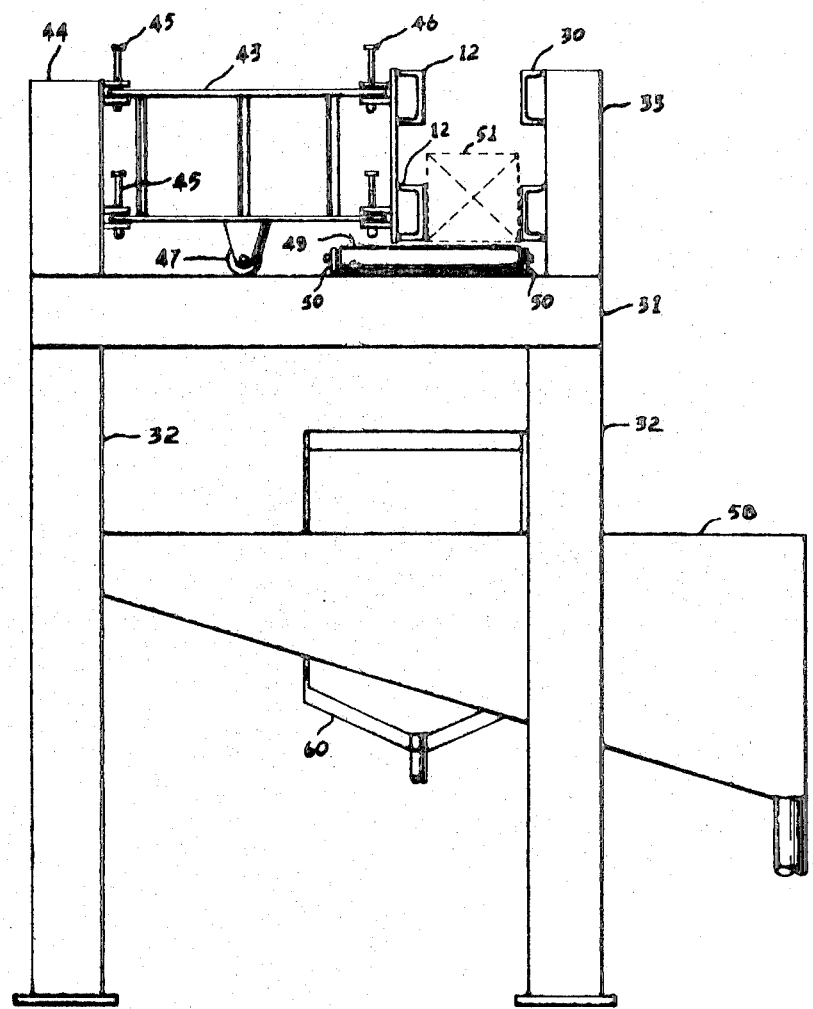
FIG. 4 shows the right end of the fuel bundle clamping table as shown in FIG. 3, but with the backing plate removed for clarity.

The table upon which the irradiated fuel bundle is clamped for disassembly is shown in detail in FIGS. 2, 3 and 4. The table has been shortened and many support braces have been eliminated for clarity.

The clamping means includes a movable clamp bar 12 and fixed clamp bars 30. The clamping assembly is supported by a horizontal frame 31 mounted on a plurality of legs 32. Fixed clamp bars 30 are secured to upstanding wall 33 mounted on frame 31. Movable clamp bars 12 are mounted on support plates 34 positioned for movement toward fixed clamp bars 30 by means of actuating cylinder 35 which may be a conventional hydraulic or air system. Actuating cylinder 35, which is attached to post 36, drives pivotable frame 37 which is attached to post 36 and to support plate 34 by pins 39 and 40, respectively. Frame 37 is pivotable about these pins to permit actuating cylinder 35 to move movable clamp bars 12. Pins 39 and 40, and all of the other pivot-pins described below, are of the remotely operable, ball-detent type. This permits the clamp table to be substantially disassembled for repair, modification, etc., by remote manipulators. Pivotable frame 37 is supported during movement by a wheel 41 which rides on support member 42.

In order to maintain movable clamp bars 12 parallel to fixed clamp bars 30, a plurality of guide frames 43 are provided. Only one guide frame 43 is shown in FIGS. 2 and 3, although generally two or more would be used. Guide frames 43 are generally similar to frame 37. Guide frame 43 is pivotably attached to post 44 by removable pins 45 and to support plate 34 by removable pins 46. Guide frame 43 is supported by wheel 47 riding on support member 48.

A conventional roller conveyor, consisting of a plurality of rollers 49 journaled in frame 50, is provided to support a fuel bundle (schematically indicated by broken lines 51 in FIG. 4) during clamping and removal of fuel rod end securing means.

Irradiated fuel bundles are stored in a water filled compartment after removal from a reactor. A conventional crane (not shown) lifts a fuel bundle by one end and brings it to the clamping table. The lower end of the bundle is lowered into tilting bucket 52 which is rotatable around pivot pins 53. Bucket 52 is mounted on support 54, which is maintained in alignment with the clamping table by suitable braces, some of which are shown at 55.

As the crane swings the fuel bundle down onto rollers 49, bucket 52 tilts up, maintaining the fuel bundle in proper alignment. The fuel bundle is then moved along the rollers until the end comes out of bucket 52 and is positioned above first trough 56. Actuating cylinder 35 is then actuated to tightly clamp the fuel bundle between movable clamp bars 12 and fixed clamp bars 30.

Hood 13 which is adjacent first trough 56 is then lifted by a conventional crane (not shown) connecting to lugs 60 and lowered over first trough 56 with one side in contact with first backing plate 57. Backing plate 57 is generally U shaped, with the opening in alignment with the roller conveyor. Backing plate 57 serves to tie the ends of fixed clamp bars 30, upstanding wall 33, and trough 56 together while providing a guide and side support for hood 13. Hood 13 has openings through which a conventional remote manipulator may remove the fuel rod end securing means. In addition, hood 13 encloses a remote-manipulator held abrasive saw (not shown) which may be remotely operated to cut off the end of the fuel bundle to release the fuel rods. A water spray system may also be included within hood 13 to wash away any highly radioactive dust produced. The water with entrained dust will be drained away to a suitable storage area.

After the fuel rod end securing means is removed, the bundle is uclamped by actuating cylinder 35 and is moved along rollers 49 until the other end of the bundle is over second trough 58. The fuel bundle is again clamped in position and the other hood 13 is lowered over the fuel bundle end guiding against second backing plate 59. The second fuel rod end securing means is removed as discussed above. With some fuel bundle designs only the end fitting nearest the pulling head need be removed to release the fuel rods.

The view of the clamping table 11 shown in FIG. 4 is taken from the right end of the table as seen in FIG. 3, with backing plate 59 removed for clarity. Backing plate 59 here is substantially rectangular in configuration, with an opening in alignment with rollers 49 through which the end of the fuel bundle passes. A drain tray 60 is provided below rollers 49 to remove any water and radioactive dust which falls through rollers 49. A water spray system (not shown) is desirably included to wash down the apparatus when desired.

After the second fuel rod end securing means is removed, the fuel bundle is ready to have individual or groups of fuel rods pulled from the bundle. The bundle is securely held in place by movable clamp bars 12 and fixed clamp bars 30 which bear only against bundle spacers, shroud, etc., and leave the rods free to move longitudinally.

As can be seen, the clamping table described above is highly effective and can be easily remotely operated, repaired and modified as necessary. Movable clamp bars 12, guide frame 43, hydraulic system 35 and tiltable bucket 52 all are secured to the device by remotely removable pins, permitting removal and replacement by remote means in this highly radioactive environment. A wide variety of fuel bundle configuration may be handled by this clamp table. Substantially any type of fuel rod end securing means, including tie plates, lifting bails, etc., may be removed to permit withdrawal of fuel rods from the bundle.

Fuel rod pulling assembly

Figure 5:
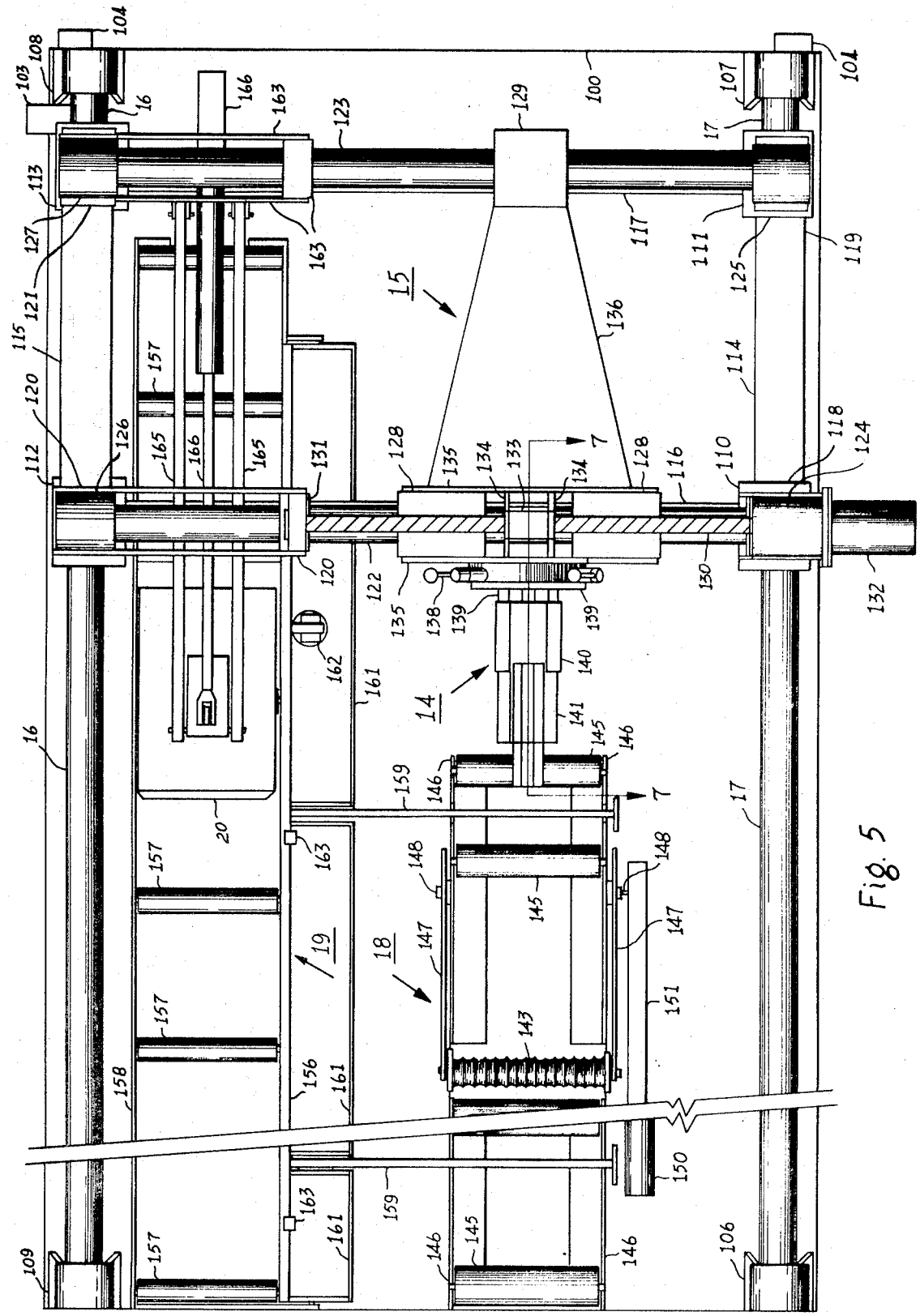
FIG. 5 shows a plan view of the fuel rod pulling assembly.
Figure 6:
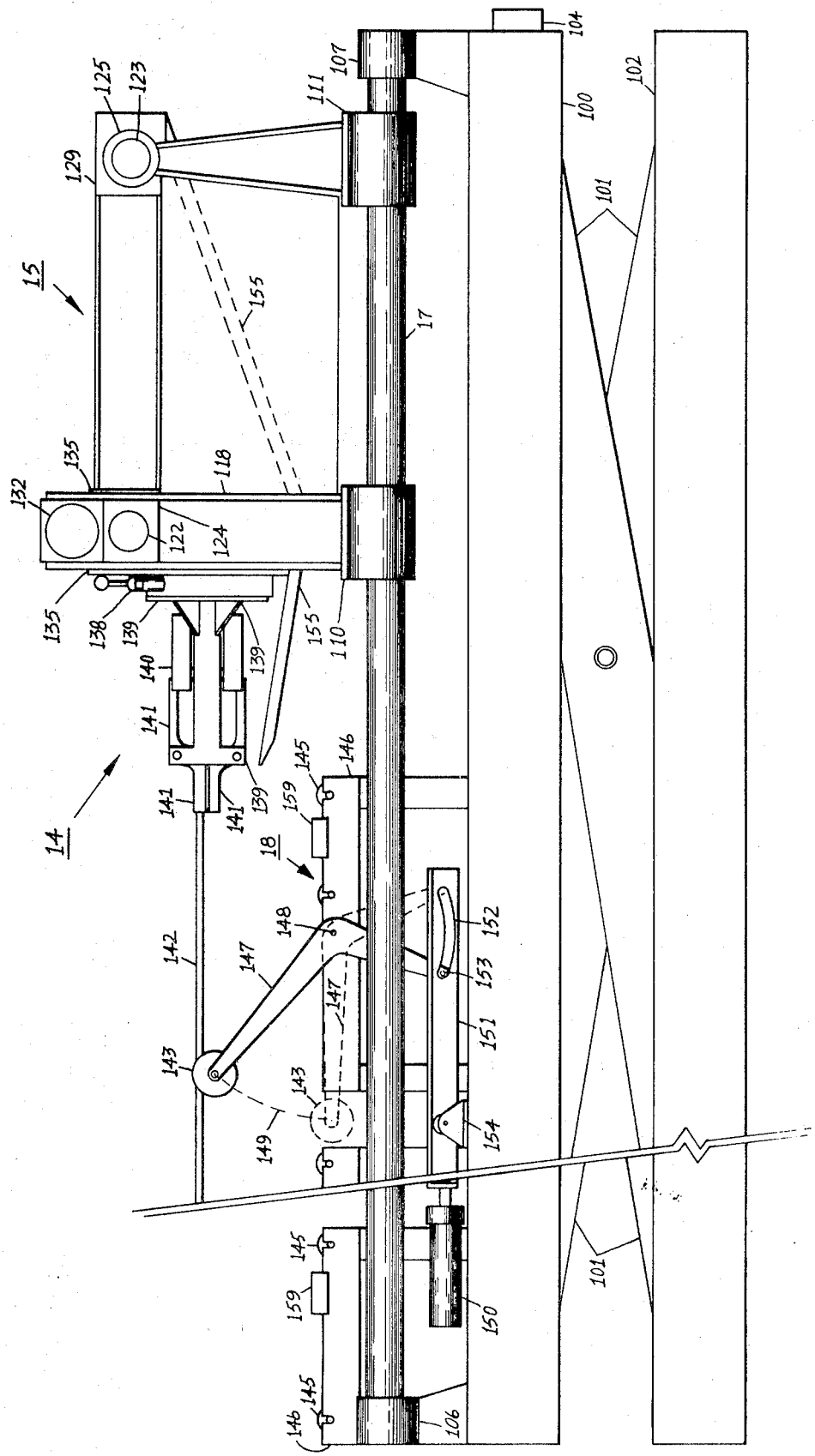
FIG. 6 shows the assembly of FIG. 5 in elevation.

FIGS. 5 and 6 show a plan and a side elevation of the fuel rod pulling assembly, respectively. In these views, the table has been greatly shortened, for clarity. Details of the fuel rod pulling assembly will be best understood if FIGS. 5 and 6 are considered together.

As seen in FIGS. 5 and 6, the assembly is supported on a large platform 100. The entire platform 100 may be raised or lowered by means of a plurality of conventional scissors jacks 101, driven by a conventional drive system generally indicated at 104. This assembly is mounted on base 102, which may be supported by or be part of the floor of the room.

Mounted on platform 100 is a pair of guide rails 16 and 17. In this embodiment, guide rails 16 and 17 are cylindrical and support the pulling head carriage, generally designated 15, for axial movement. Guide rails 16 and 17 are mounted in parallel alignment on platform 100 by means of end mounts 106, 107, 108 and 109.

Carriage 15 which supports rod pulling head 14 is mounted on guide rails 16 and 17 for movement along the guide rails by means of four tubular members 110, 111, 112 and 113 which closely surround the respective guide rails. Carriage 15 may be driven along guide rails 16 and 17 by any conventional drive. Typically, the drive may include an endless chain running below guide rail 16 from a drive sprocket adjacent support 108 to an idler sprocket adjacent 109. This chain is fastened to tubular members 112 and 113 so that carriage 15 moves as a drive means schematically shown at 103 moves the drive chain, which is hidden beneath guide rail 16 in FIG. 5. A similar, synchronized drive means may be used under guide rail 17 to help drive carriage 15, if desired. Any other suitable carriage drive means may be used, if desired. For example, a long screw drive, similar to drive screw 130, could be mounted parallel to guide rail 16 and/or 17.

The four tubular members 110, 111, 112 and 113 are rigidly tied together by axial tie plates 114 and 115 and transverse tie plates 116 and 117, as seen primarily in FIG. 5, with transverse tie plates 116 and 117 partially hidden.

Carriage 15 is also arranged to permit movement of rod pulling head 14 transverse to guide rails 16 and 17. This arrangement includes vertical supports 118, 119, 120 and 121 which hold transverse guide rails 122 and 123 in parallel alignment by means of end blocks 124, 125, 126 and 127. Carriage 15 includes tubular sleeves within housings 128 and 129 which surround transverse guide rails 122 and 123, respectively, and permit transverse sliding movement. Housings 128 and 129 and vertical supports 118 and 119 are enclosed by plates 136 for rigidity.

Pulling head 14 on carriage 15 is driven transversely of the table by means of screw 130 which is supported by bearing 131 at one end and by a drive means 132 at the other. A drive nut 133 is fastened to carriage 15 by plates 134 and 135 so that as screw 130 turns, pulling head 14 moves transversely across the table. Rod pulling head 14 is described in greater detail in FIGS. 7–9, below. Rod pulling head 14 is held on plate 135 by means of locking pins in locking means 138 which engage head support 139. Movable clamp actuators 140 engage clamp levers 141 to clamp fuel rod 142 (as seen in FIG. 6) during the pulling operation.

Automatically operating fuel rod supports 143 are provided to support the fuel rods without bending during the pulling operation. A plurality of these fuel rod supports 143 are located along a receiving table generally designated 18, although only one is shown in FIGS. 5 and 6, for clarity. Receiving table 18 includes a plurality of rollers 145 journaled loosely in edge slots in plates 146 which are mounted on platform 100. Fuel rod supports 143 consist of corrugated rollers which hold fuel rods during pulling while preventing excessive transverse slippage across the roller. The corrugated rollers are supported on generally L-shaped arms 147 which are rotatable about pivot 148 through the arc shown by dashed line 149 in FIG. 6. The fuel rod support system is shown both in fuel rod pulling position (solid lines) and in rod transfer position (broken lines) in FIG. 6. Arms 147 are counterweighed to swing up into the position shown in solid lines in FIG. 6 when not restrained. To lower the arm to the position shown at 147', an actuating cylinder 150, which may be an air or hydraulic system, moves a control bar 151 having an arcuate slot 152 engaging a pin 153 on the lower extension of arm 147 to the right as seen in FIG. 6. Control bar 151 has a cross-section resembling an inverted L, with slot 152 in the vertical face and the horizontal face riding on support roller means 154. As seen in FIG. 6, when clamp lever 141 reaches fuel rod 142, actuating cylinder 150 moves control bar 151 to the right lowering roller 143 to the position shown at 143'. The fuel rod is then transferred to holding table 19, as described below. Carriage 15 then moves to the left to engage another group of fuel rods. Control bar 151 is moved to the left, allowing roller 143 and arm 147 to pivot upwardly under the influence of the counterweight. As carriage 15 moves to the right, pulling one or more fuel rods from the bundle, rod 155 below rod pulling head 14 engages rollers 143, pivoting arm 147 downwardly until carriage 15 has passed. While in general hidden parts are not indicated in the drawing, the location of rod 155 between vertical supports 118 and 119 behind vertical plate 136 is indicated by broken lines. Slot 152 allows pins 153 to move freely during this sequence of events.

After each rod or group of rods has been released by clamp lever 141 and lowered to rollers 145 by support rollers 143, they are transferred to a holding table generally designated 19. Fuel rods are accumulated on holding table 19 until the number which can be accepted by the shear assembly is reached.

Holding table 19, as seen in FIG. 5, includes a plurality of rollers 157 journaled in frames 156 and 158. A plurality of rod transfer bars 159 are rigidly fastened to frames 156 and 158 and extend across receiving table 144. Holding table 19 and transfer bars 159 may be tilted around pivots beneath table 19 connected to support frame 161 which is secured to platform 100. As actuating cylinder 162 tilts table 19, transfer rods 159 rise, contact fuel rods on receiving table 144 and cause them to slide and roll over onto holding table 19. Frame 158 extends upwardly above rollers 157 and acts as a stop for fuel rods rolling onto holding table 19 and as a side guide during longitudinal movement of groups of fuel rods along rollers 157. A plurality of pivotable guides 163 are arranged above frame 156, extending above rollers 157. Guides 163 serve to guide fuel rods for longitudinal movement along rollers 157 during the rod feeding operations. These guides 163 are pivoted below table 19 so that they move downwardly when table 19 is tilted so as not to interfere with the transfer of fuel rods from receiving table 18 to holding table 19.

A rod pusher 20 is provided to push accumulated rods from holding table 19 to the shear feed table when the desired number have accumulated. Rod pusher 20 is supported by frame 163 mounted on transverse guide rail 123 by means of guide rods 163. Since pusher 20 must move to the left with carriage 15 each time a group of fuel rods is pulled from the bundle, an actuating cylinder 166 is provided to lift pusher 20 out of engagement with fuel rods on holding table 19 until the desired number of fuel rods have accumulated on holding table 19. Guide rods are pivotably attached to pusher 20 and to frame 163. The attachment point to frame 163 is somewhat below actuating cylinder 166. Thus, as actuating cylinder 166 retracts, pusher 20 is lifted above table 19. Pusher 20 need only be lifted a few inches to clear fuel rods on table 19. When the desired number of fuel rods have accumulated, pusher 20 is lowered onto the table by actuating cylinder 166 so that all of the rods on holding table 19 are pushed to the left onto the shear feed table when carriage 15 next moves to the left.

Figure 7:
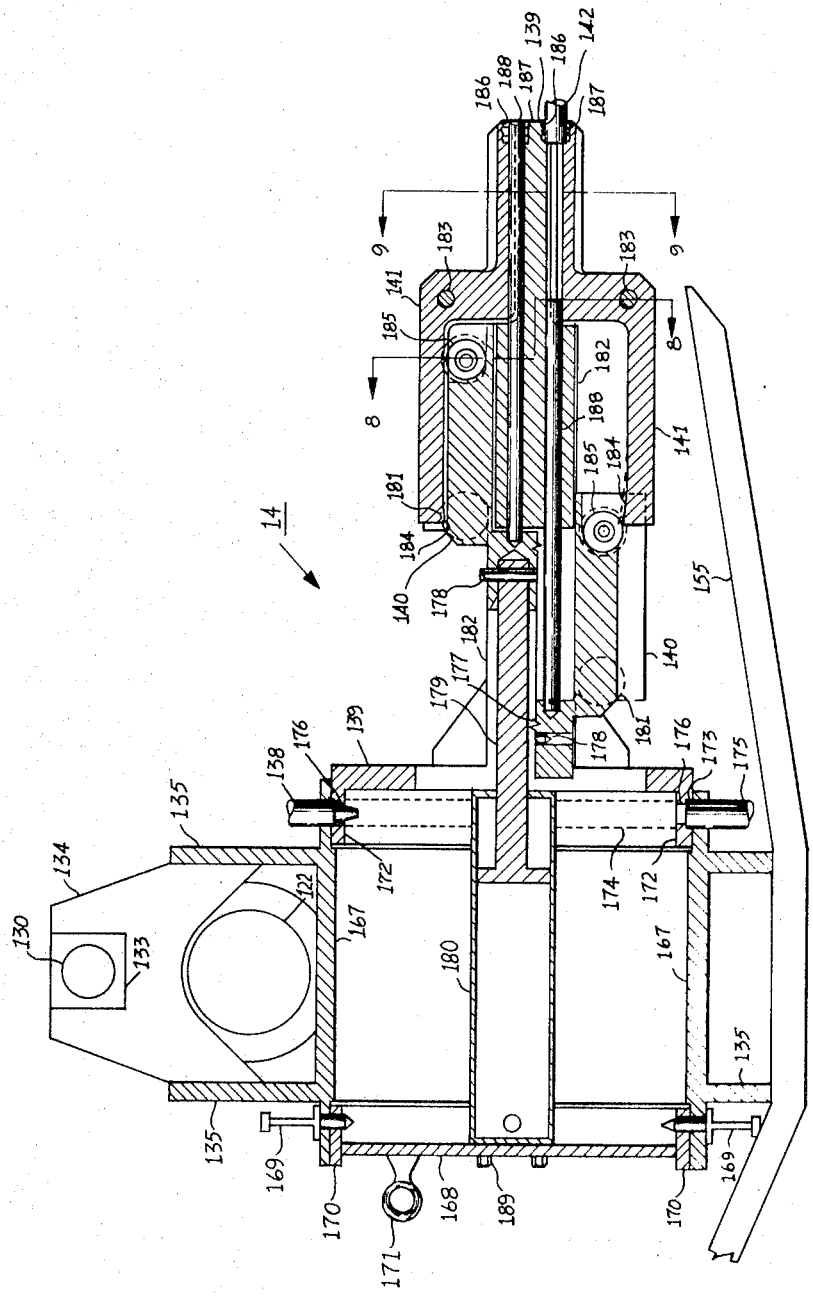
FIG. 7 is a vertical cross-sectional view taken along section line 7—7 in FIG. 5.

FIG. 7 shows a section taken through the fuel rod pulling head on line 7—7. The rod pulling head will best be understood by considering FIG. 7 together with FIGS. 8 and 9, which show sections through the rod pulling head taken on lines 8—8 and 9—9, respectively in FIG. 7. Pulling head 14 is mounted for movement with carriage 15 (as seen in FIGS. 5 and 6) on plates 135.

Integral with plates 135 is a horizontal cylindrical housing 167. Closure plate 168 closes one end of housing 167. Closure plate 168 is held in position by conventional remotely removable ball-detent pins 169 through holes in housing 167 and mating holes in cylindrical flange 170 on the closure plate. Eyes 171 are provided on closure plate 168 to permit remote removal of closure plate 168 after pins 169 have been removed.

Rod pulling head 14 is mounted on the other end of cylindrical housing 167 by means of a cylindrical flange 172 on head support 139. Flange 172 has an external circumferential groove 173 (shown in part by broken line 174) into which retaining pins 175 are seated to retain head support 139 in axial position while permitting head support 139 to be rotated about the axis of cylindrical housing 167. While only one pin 175 is shown for clarity, in practice a plurality of spaced retaining pins 175 are used. At various locations (typically every 45°) around the circumference of flange 172 there are located holes 176 into which locking pins 138 may be inserted to prevent rotation of head support 139. Holes 176 have diameters less than the width of groove 173 to prevent retaining pins 175 from entering holes 176. Thus, the rod pulling head may be rotated at any time and locked in a desired position. Also, by merely withdrawing retaining pins 175 and locking pins 138, the entire rod pulling head may be removed for replacement or repair. This operation may easily be performed remotely with conventional remote manipulating devices. Pins 138 and 175 may be conventional cam-actuated withdrawable pins. Such pins have a shoulder which engages a rotatable cam surface. When the cam surface is rotated by means of a handle, such as shown at 138 in FIG. 5, the pin is cammed up out of the opening. Returning the handle to the original position returns the pin to engaging position.

The rod pulling head includes head support 139, clamp actuator 140 and clamp levers 141. In order to more fully indicate how the rod pulling head operates clamp actuator 140 is shown divided into two portions, with the upper portion showing the clamp open and the lower portion showing the clamp closed. Of course, clamp actuator 140 is actually a single solid piece and both the upper and lower clamps are opened and closed simultaneously. Clamp actuator 140 is shown divided on line 177, with pin 178 being actually a single piece. Clamp actuator 140 is moved axially by means of piston 179 in hydraulic cylinder 180 within cylindrical housing 167. Since hydraulic cylinder 180 is secured only to closure plate 168 by bolts 189, it can easily be removed for replacement or repair with closure plate 168 merely by withdrawing pin 178 and removing closure plate 168. Clamp actuator 140 is guided by rollers 181 (shown by broken lines in FIG. 7, with the clearest showing in FIG. 8) which ride on surface 182 of the head support 139. Clamp levers 141 are pivoted about pins 183 which are mounted in head support 139. At their rearward ends, clamp levers 141 have a cam surface 184 which is engaged by rollers 185 as clamp actuator 140 is moved toward cylindrical housing 167. As cam surfaces 184 are forced outwardly, the opposite ends of clamp levers 141 are pivoted toward head support 139, tightly gripping fuel rods between opposed gripping surfaces 186 and 187 on clamp levers 141 and head support 139, respectively, as seen in the lower portion of pulling head 14 in FIG. 7. After carriage 15 has moved (as shown in FIGS. 5 and 6) a sufficient distance to pull the fuel rods from the bundle, clamp actuator 140 is moved forward by piston 179 so that rollers 185 move away from cam surfaces 184, releasing the fuel rods. Ejector pins 188 mounted on clamp actuator 140 simultaneously move forward to push the fuel rods from between surfaces 186 and 187, as seen in the upper portion of the pulling head in FIG. 7.

Figure 8:
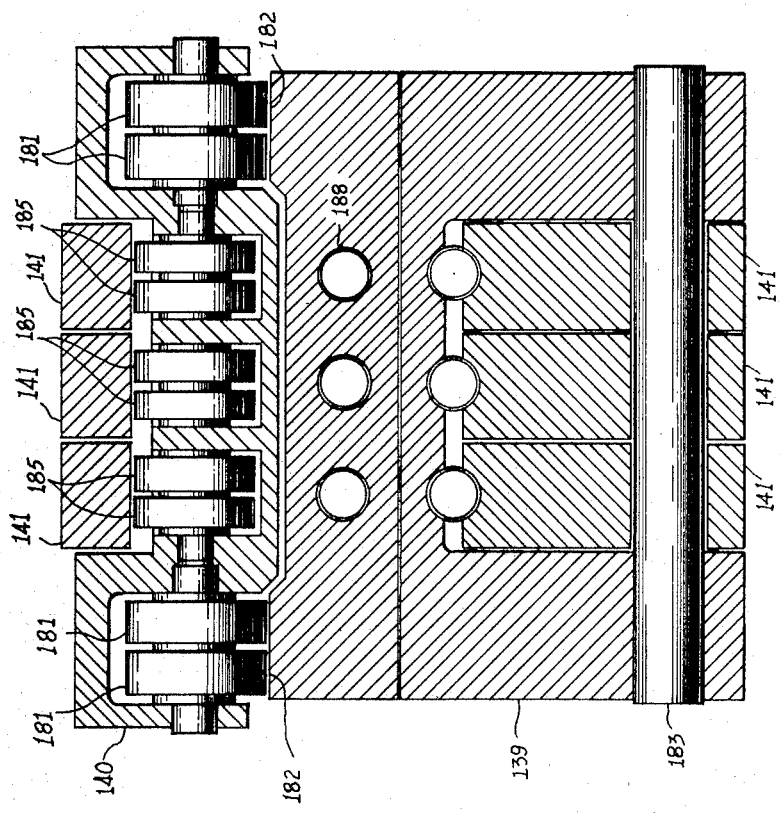
FIG. 8 is a vertical cross-sectional view taken along section line 8—8 in FIG. 7.
Figure 9:
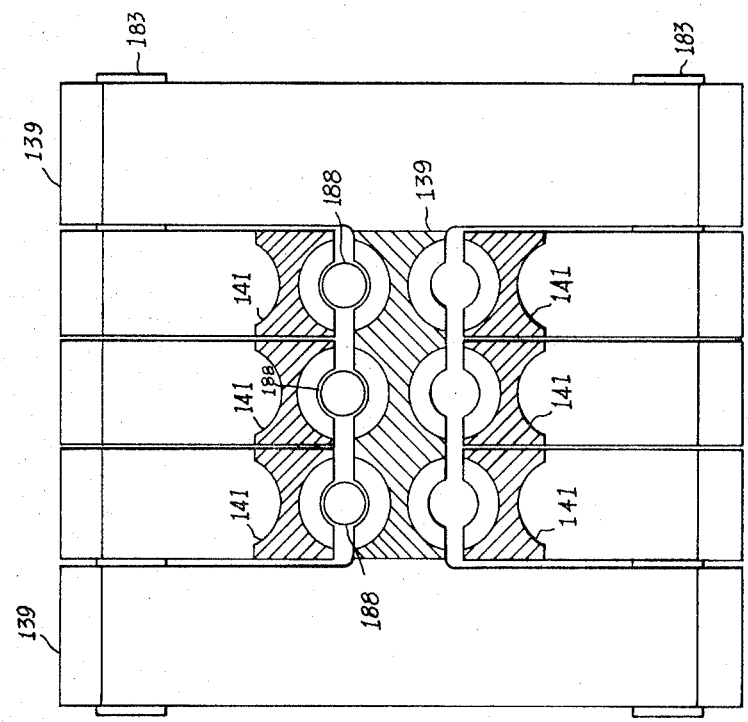
FIG. 9 is a vertical cross-sectional view taken along section line 9—9 in FIG. 7.

It should be noted that one of the fuel rod clamps is located on the axis of cylindrical housing 167. As seen in FIGS. 7, 8 and 9, this is the upper center rod clamp. Thus, it is possible to grasp a single fuel rod with this clamp, release locking pins 138 and rotate pulling head 14 either before or during withdrawal of the fuel rod from the bundle. This permits convenient removal of fuel rods which are threaded into the bundle or include a rotational locking means.

As best seen in FIGS. 8 and 9, the embodiment shown is cable of simultaneously pulling 6 rods, in two parallel rows of three, at one time. As discussed above, the rod pulling head shown may be easily remotely removed and replaced with another head having a different number, size, shape, and/or spacing of clamping apertures, to accommodate fuel bundles of a different design.

Shear feed assembly

Figure 10:
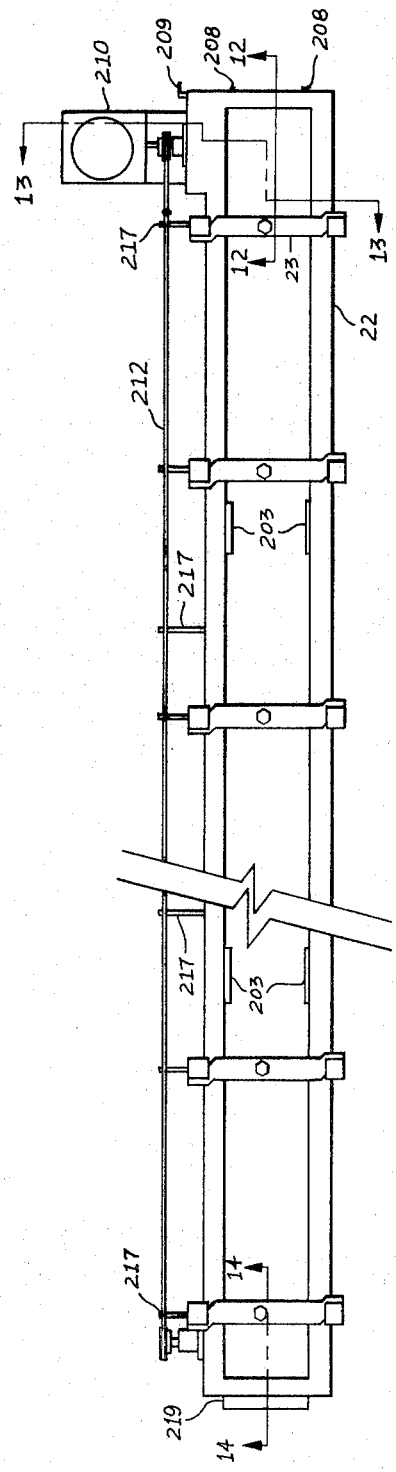
FIG. 10 is a plan view of the fuel rod handling and shear feed assembly.
Figure 11:
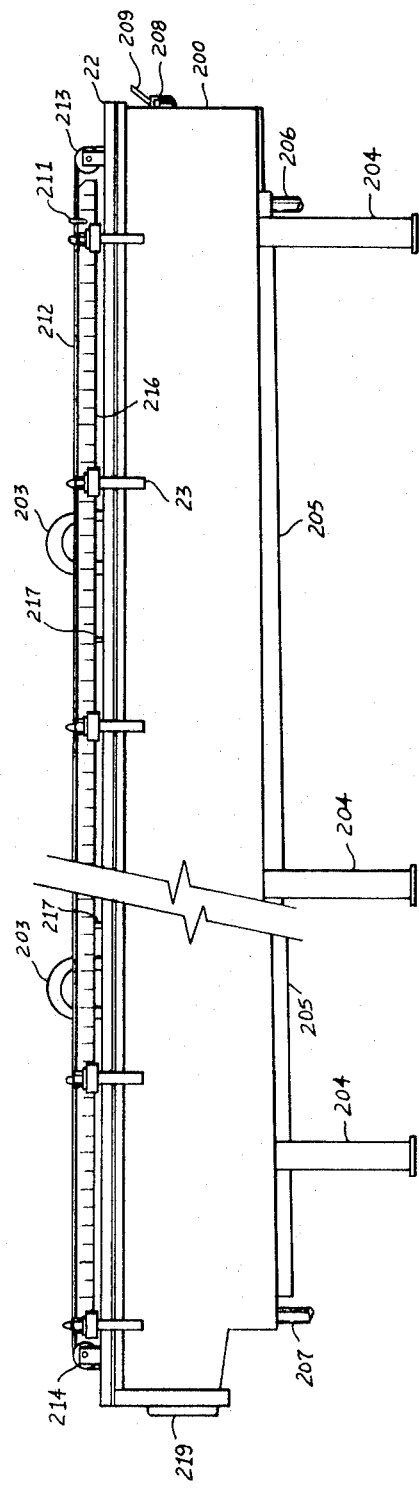
FIG. 11 is an elevation of the assembly shown in FIG. 10.

FIGS. 10 and 11 show plan and side elevational views, respectively, of a fuel rod feed assembly which receives groups of fuel rods from the rod pulling assembly and feeds them incrementally into the shear.

As seen in FIGS. 10 and 11, the shear feed assembly generally designated 21 in FIG. 1 externally consists primarily of a housing 200 which encloses the fuel rods and the feeding mechanisms. This housing 200 retains radio-active dust produced in the shearing operation which may enter the feed assembly. A removable cover 22 is held onto housing 200 by a plurality of clamps 23. These clamps 23 are described in greater detail below. When clamps 23 are disengaged, the entire cover 22 may be easily removed by a conventional crane coupled to lifting lugs 203.

Figure 12:
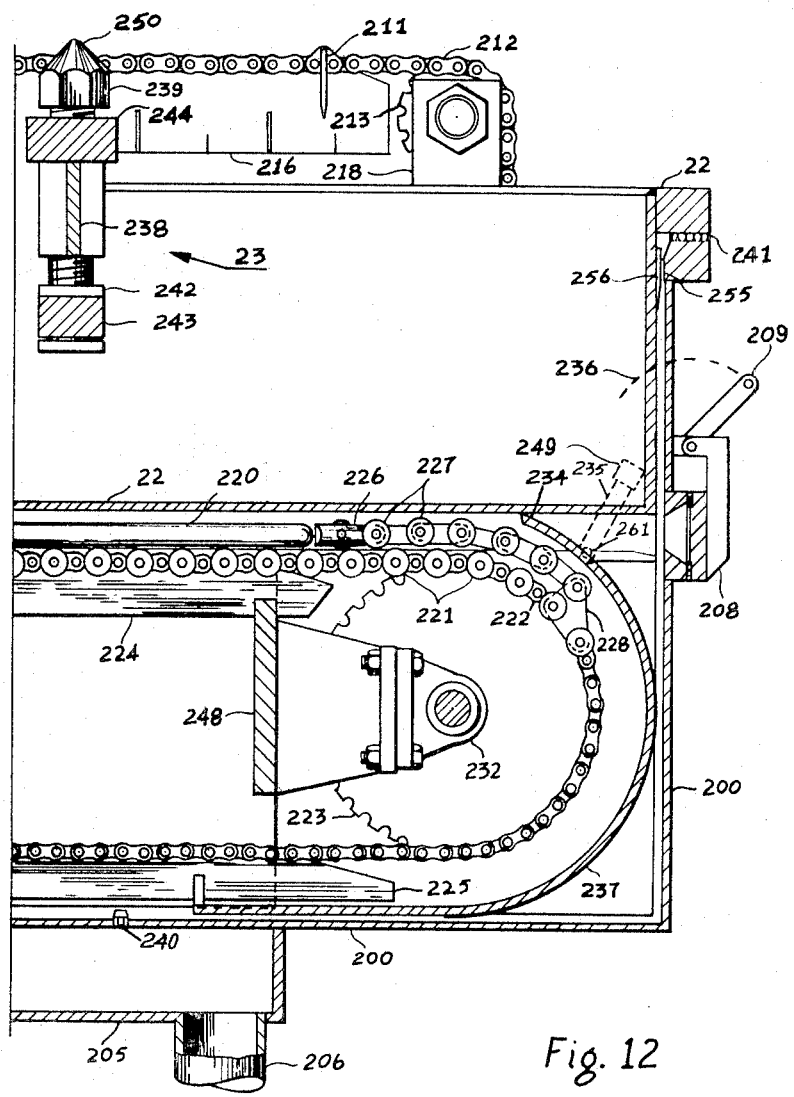
FIG. 12 is a vertical cross-sectional view taken along section line 12—12 in FIG. 10.

Housing 200 is supported on a plurality of legs 204. A header 205 runs along the bottom of housing 200. Header 205 is kept filled with water under pressure from fill pipe 206. This water is sprayed into housing 205 through a plurality of nozzles 240 (as shown in FIG. 12) to flush from the apparatus any radioactive dust from the shearing operation which may enter housing 200. The water with entrained dust is taken off through drain 207 to the fuel reprocessing area (not shown).

Fuel rods from the fuel rod pulling assembly enter housing 205 through door 208, which is then closed to prevent the escape of any radio-active dust. Door actuator 209 may be operated by any conventional means which may be remotely controlled.

Fuel rods are incrementally moved through housing 205 by an internal pusher assembly (shown in detail in FIGS. 12 and 14) driven by drive means 210, which may be any conventional drive, such an electrical or air-driven motor.

Drive means 210 simultaneously drives a position indicator 211 which indicates to an external observer the position of the pusher during feeding of fuel rods to the shear. Position indicator 211 is fastened to an endless chain 212 which is driven by drive means 210 through sprocket 213 which is mounted between scale plate supports 217 and sprocket supports 218. Idler sprockets 214 and 215 guide chain 212 along the top edge of a scale plate 216 which supports the chain. Scale plate 216 is held in position by a plurality of scale plate supports 217. Thus, an observer viewing the shear feed assembly from behind thick shielding glass can easily determine the position of the pushed end of the fuel rods at any time. Fuel rods are fed to the shear through end housing 219.

Figure 13:
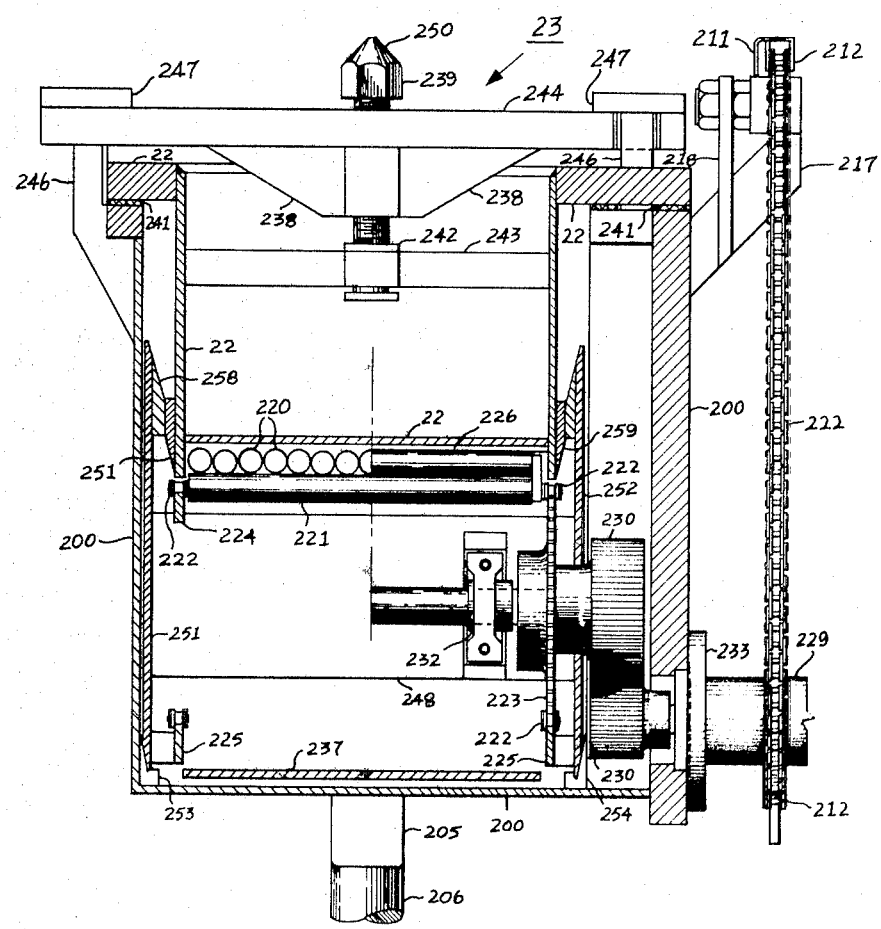
FIG. 13 is a vertical cross-sectional view taken along section line 13—13 in FIG. 10.

Details of the internal structure of housing 200 and of the fuel rod pushing assembly will become further apparent upon reference to FIGS. 12 and 13, taken together. FIGS. 12 and 13 show sections through housing 200 taken on lines 12—12 and 13—13, respectively.

As seen in these figures, fuel rods 220 are supported by a plurality of rollers 221, which form part of chain 222. Chain 222 is entrained around drive sprocket 223 and idler sprocket 267 (shown in FIG. 14). Chain 222 is prevented from sagging between the sprockets by support plates 224 and 225 along the edges of which chain 222 rides.

A pusher assembly comprising a pusher bar 226 and a flexibly connected array of rollers 227 is secured to chain 222 by tie plates 228. Pusher bar 226 engages the ends of fuel rods 220 and pushes them through housing 200 when sprocket 223 is rotated by a drive means 229 acting through gear train 230. The drive means may be any suitable reversible drive, e.g., an electric motor or a conventional air drive system. An indicator drive sprocket is mounted on the shaft of drive means 229 to drive position indicator 211 by means of chain 212. The size of the indicator drive sprocket is chosen so that movement of position indicator 211 is synchronized with the movement of pusher bar 226. Bearings 232 and 233 support sprocket 223 and the indicator drive sprocket, respectively. Bearings 232 are mounted on plate 248, which is in turn fastened to side support panels 251 and 252.

After pusher bar 226 has pushed one entire set of fuel rods 220 through the shear, the direction of movement of chain 222 is reversed until pusher bar 226 is back below flap 234. Flap actuator 235 (shown in broken lines), rigidly attached to flap 234, is in the position shown in FIG. 12. Door 208 is then opened by moving door actuator 209 in the direction shown by broken line 236. A group of fuel rods is then pushed against the end of flap 234 from the adjacent fuel rod holding table. As the fuel rods push against flap 234, it and flap actuator 235 pivot to the left about pivot 261. The upper surface of flap 234 helps to guide fuel rods 220 into housing 200. Flap 234 is held in the downward position by counterweight 249 at the end of actuator 235 which is now above and to the left of pivot 261. Chain 222 is now moved to bring rod pusher 226 into engagement with fuel rods 220, in the position shown in FIG. 12. As rod pusher 226 pushes against flap 234 (which is still the downward position in contact with chain 222), it lifts upward to the position shown in FIG. 12. Counterweight 249 now holds flap 234 in the upward position since it is now to the right of pivot 261. Fuel rods 220 are slightly restrained at their opposite end, as discussed below, so that the rods do not move with rollers 221 while pusher rod 226 is being brought into engagement. Guide means 237 and flap 234 serve to guide rod pusher 226 around sprocket 223 and into fuel rod engaging position. The assembly is then ready to begin incrementally feeding fuel rods 220 into the shear.

During shearing, radioactive dust particles may enter housing 200 from the shear assembly. A plurality of spray nozzles 240 are provided so that the interior of housing 200 may be washed down. Water may be sprayed regularly during operation, or only just before cover 22 is to be removed, if desired.

Cover 22 extends down over fuel rods 220 to act as an upper guide. A plurality of clamp assemblies 23 hold cover 22 tightly against housing 200. Elastomeric sealing material 241 prevents leakage of radioactive dust between cover 22 and housing 200.

Each of the cover clamp assemblies includes a bearing block 241 rigidly fastened to cover 22 by mounting bar 243. A bolt 239 is threaded through a threaded aperture in clamp bar 244 and bears against a depression in bearing block 242. Braces 238 further strengthen clamp bar 244. A pair of locking members are secured to opposite sides of housing 200 adjacent cover 22. Each locking member includes a vertically upstanding member 246 with an enlarged head portion 247 at each end so that as it is rotated in a horizontal plane about bolt 239 the notches engage and partially surround upstanding members 246 just below heads 247. When bolt 239 is rotated, threaded clamp bar 244 rises on bolt 239. This causes the ends of clamp bar 244 to press upwardly against the undersurfaces of heads 247 while the lower end of bolt 239 presses downwardly on bearing block 242. Thus, cover 22 is securely held against housing 200.

Cover 22 may be easily removed and replaced by means of conventional remote handling devices. Bolts 239 are provided with conical heads 250 so that a remotely operated wrench may easily be slipped over the bolt heads. The bolts are loosened and clamp bars 244 are rotated out of engagement with heads 247 of the locking members. Cover 22 may then be lifted off, giving access to the interior of housing 200.

The entire fuel rod support and pusher assembly may then be lifted out, since it is not rigidly fastened into housing 200. Side support panels 251 and 252 support the entire fuel rod handling assembly, including sprockets 223 and drive gear 230. The lower edges of side support panels 251 and 252 fit into longitudinal V-shaped grooves in support blocks 253 and 254 which maintain side support panels 251 and 252 in proper alignment with housing 200. The shape of these grooves in blocks 253 and 254 permit the fuel rod handling assembly to be lowered into place by a crane operated remotely, since the system is selfaligning. Similarly, a plurality of cooperating surfaces are provided between cover 22 and housing 200 (typically, at 255-256) and between cover 22 and the fuel rod handling assembly (typically, at 257-258 and 259-260). These permit the cover to be easily replaced in proper alignment with other parts using remote handling equipment.

Figure 14:
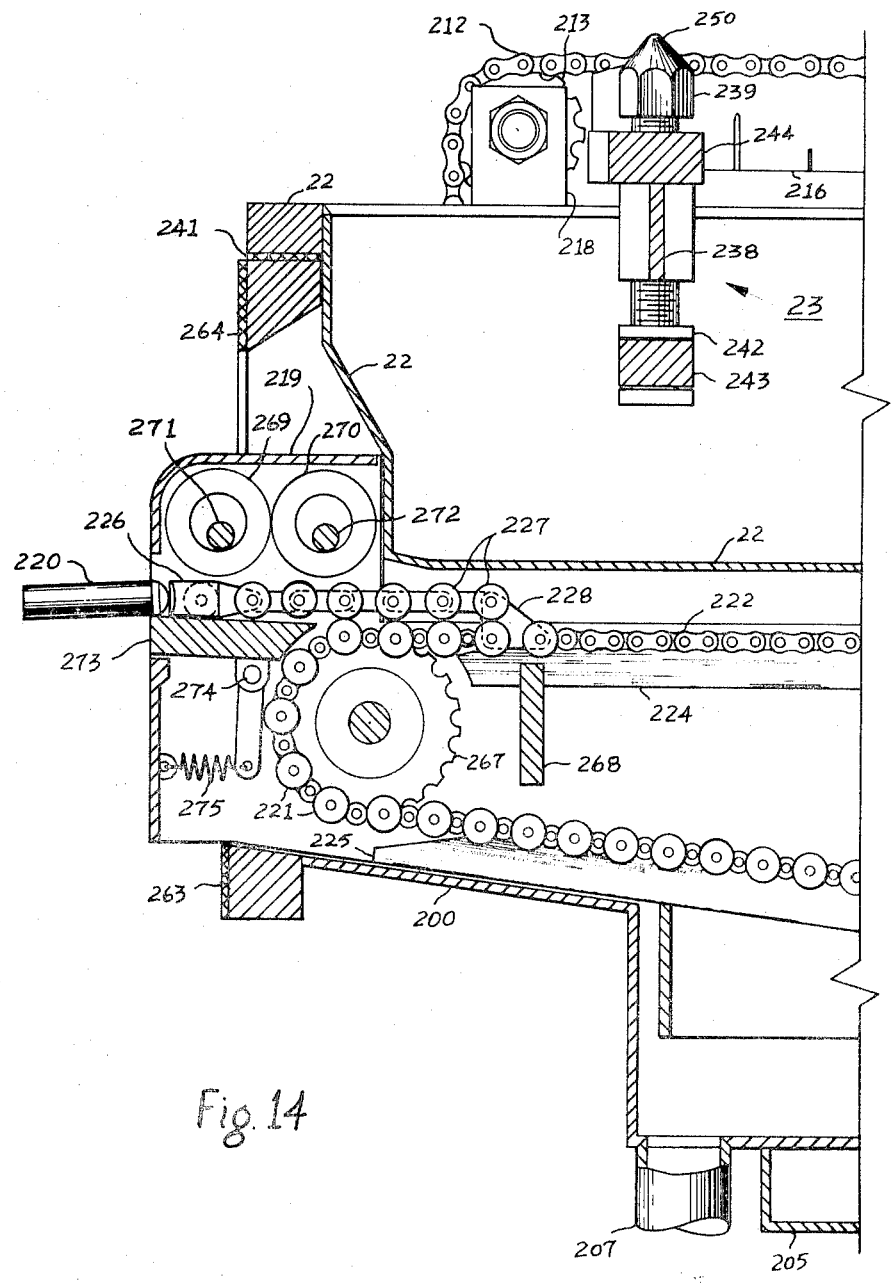
FIG. 14 is a vertical cross-sectional view taken along section line 14—14 in FIG. 10.

FIG. 14 shows a section through housing 200 taken on line 14—14. This shows the end of the shear feed assembly from which fuel rods are delivered to the shear.

The shear housing tightly abuts feed housing 200 at 263 and 264 where elastomeric sealing material is provided to prevent leakage of radioactive dust from the enclosure.

Idler sprocket 267 is held in a bearing (not shown) which is similar to bearing 232, mounted on support plate 268 which is fastened to side support plates 251 and 252 (as seen in FIG. 13). Idler sprocket 267 rotates as chain 222 is driven back and forth.

A plurality of thin washers 269 and 270 are loosely supported on shafts 271 and 272, respectively. Each washer may have a thickness somewhat less than the diameter of the fuel rods. As the ends of the fuel rods approach the shear, these washers which loosely press against the fuel rods, help to keep them in a proper parallel arrangement. A pivoted platform 273 is provided to raise the fuel rods slightly just before they enter the shear. Platform 273 is biased upwardly around pivot 274 by spring 275. This keeps short rod ends pressed against washers 269 so that they retain the proper alignment as they enter the shear and insures that the front end of the fuel rods entering the shear will not catch on the edge of the shear table. After a cut is made, the front end of the remaining fuel rod has a small lip as a result of a "wiping" action of the shear blade. This lip must clear the further fixed shear blade as the rods are pushed into the shear assembly. Tilt platform 273 lifts the fuel rod ends sufficiently to insure that the lip clears the fixed shear blade. Washers 269 and platform 274 lightly grip the rod ends and provide a slight restraining force against rod movement. This keeps the pushed ends of the fuel rods in contact with rod pusher 226 so that position indicator 211 always accurately indicates the position of the fuel rod ends.

It should be noted that, when the fuel rod feed assembly is to be lifted out of housing 200 after cover 22 is removed, the right end should be lifted first, as seen in FIGS. 12 and 14, and the assembly should be displaced slightly to the right before lifting the entire assembly, so that idler sprocket 267 clears washers 270 and end housing 219.

Thus the shear feed assembly is seen to be a simple and efficient device which may be conveniently operated, disassembled and reassembled from a remote position with complete safety.

Shear assembly

Figure 15:
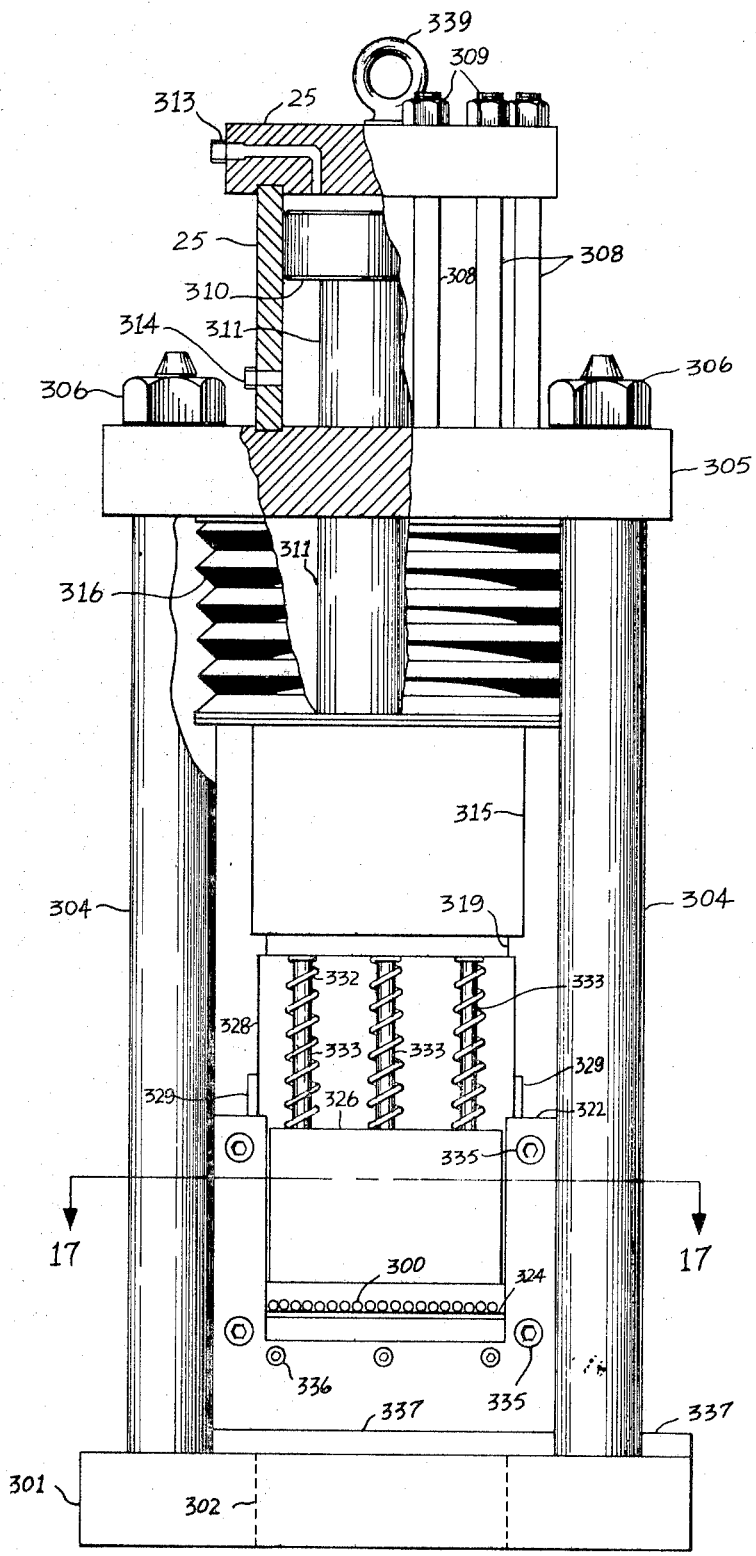
FIG. 15 is an elevation of the fuel rod shear taken across the fuel rod axis.
Figure 16:
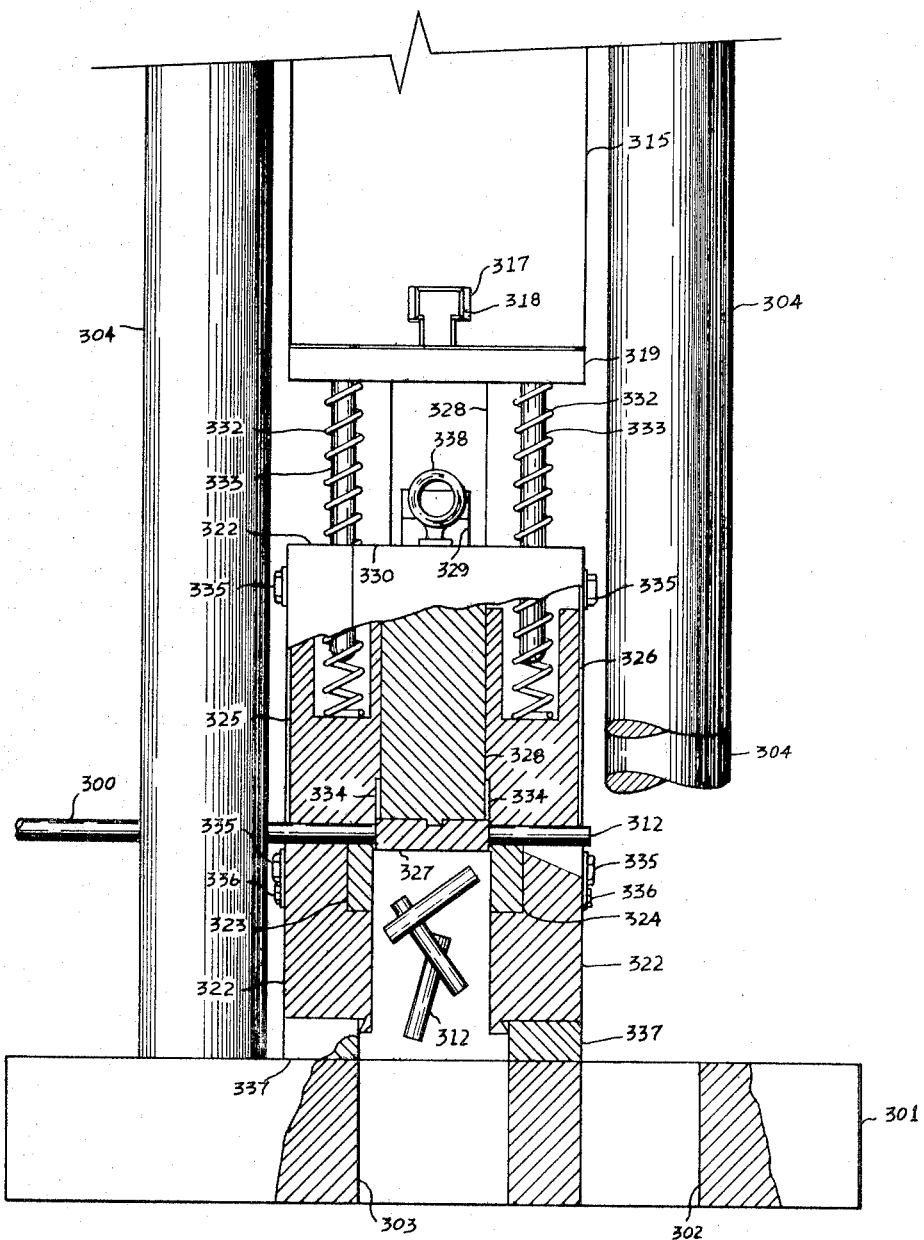
FIG. 16 is an elevation of the fuel rod shear taken along the fuel rod axis.

FIGS. 15 and 16 show partly broken away end and side views, respectively, of the fuel rod shear assembly.

As indicated above, the shear assembly housing tightly abuts the discharge end of the fuel rod feed assembly. Fuel rods 300 are fed into the shear assembly, where two transverse cuts are made across the group of fuel rods, simultaneously cutting two short pieces 312, generally of substantially equal length, from the end of each fuel rod.

The shear assembly is supported on a base platen 301 having discharge opening 302 and 303 through which cutoff pieces of the fuel rods drop. Four heavy columns 304 are rigidly secured to base platen 301. An upper platen 305 is rigidly secured to columns 304 by large nuts 306 which are threaded onto reduced diameter extensions of column 304 which extend through holes in upper platen 305.

A hydraulic cylinder 25 is secured to upper platen 305 by a plurality of studs 308 secured by nuts 309.

Hydraulic cylinder 25 contains a piston 310 connected to a ram 311. Hydraulic fluid under pressure to drive piston 310 is admitted as needed through orifices 313 and 314. Ram 311 is connected to ram adaptor 315 below upper platen 305. Ram 311 is protected from abrasive radioactive dust produced during shearing by a metal bellows 316.

FIG. 16 does not show the shear assembly above ram adaptor 315 since a side view of this portion would be substantially as shown in FIG. 15.

The lower end of ram adaptor 315 has a transverse T-shaped slot 317 into which a T-shaped extension 318 of plate 319 fits. This permits easy disassembly of the shear, as is discussed further below.

A fixed frame 322 holds two fixed shear blades 323 and 324 and guides two fuel rod clamps 325 and 326 and moving shear blade 327. Moving shear blade 327 is rigidly connected to plate 319 on ram adaptor 315 through drive member 328. Drive member 328 has transversely extending rails 329 which engage mating grooves in center section 330 of fixed frame 322 to guide the drive member 328 during shearing. The outer and center portions of fixed frame 322 are held together by bolts 335 extending therethrough. Fixed blades 324 and 323 are held in position on fixed frame 322 by bolts 336 extending thereinto.

Rod clamps 325 and 326 are biased downwardly by springs 332 arranged around spring guides 333.

FIG. 16 shows the shear at the conclusion of a shearing stroke. As moving shear blade 327 is withdrawn upwardly, rod clamps 325 and 326 continue for a short time to clamp fuel rod 300 and cut-off piece 312, respectively. When blade 327 reaches the end of recess 334, it engages rod clamps 325 and 326 and lifts them upwardly. Clamped cut-off pieces 312 are released and fall through discharge opening 302. Fuel rods 300 are then moved into the shear zone the desired distance. This distance may be determined by an operator watching indicator 211 as shown in FIG. 12 or may be set automatically, such as by the rods contacting a retractable stop or by a microswitch which is operated by the end of the fuel rod when it reaches the desired position. Ram 311 is then moved downwardly. Rod clamps 325 and 326 engage the fuel rods to hold them in position, then moving shear blade 327 shears the fuel rods and the cycle is repeated.

The shear assembly may be easily disassembled for repair, replacement of parts, etc., by remotely operated manipulators. As can be seen especially in FIG. 16, fixed frame 322 is supported by a pair of support rails 337. Thus a hook can be engaged in pad eye 338, and the entire shear assembly can be moved transversely and then lifted away for repair or replacement. Extension 318 on plate 319 slips out of slot 317 as fixed frame 322 slides along rails 337. Also, nuts 306 may be removed by a remotely operated wrench and the upper platen and hydraulic cylinder 25 may be lifted off by means of pad eye 339.

Figure 17:
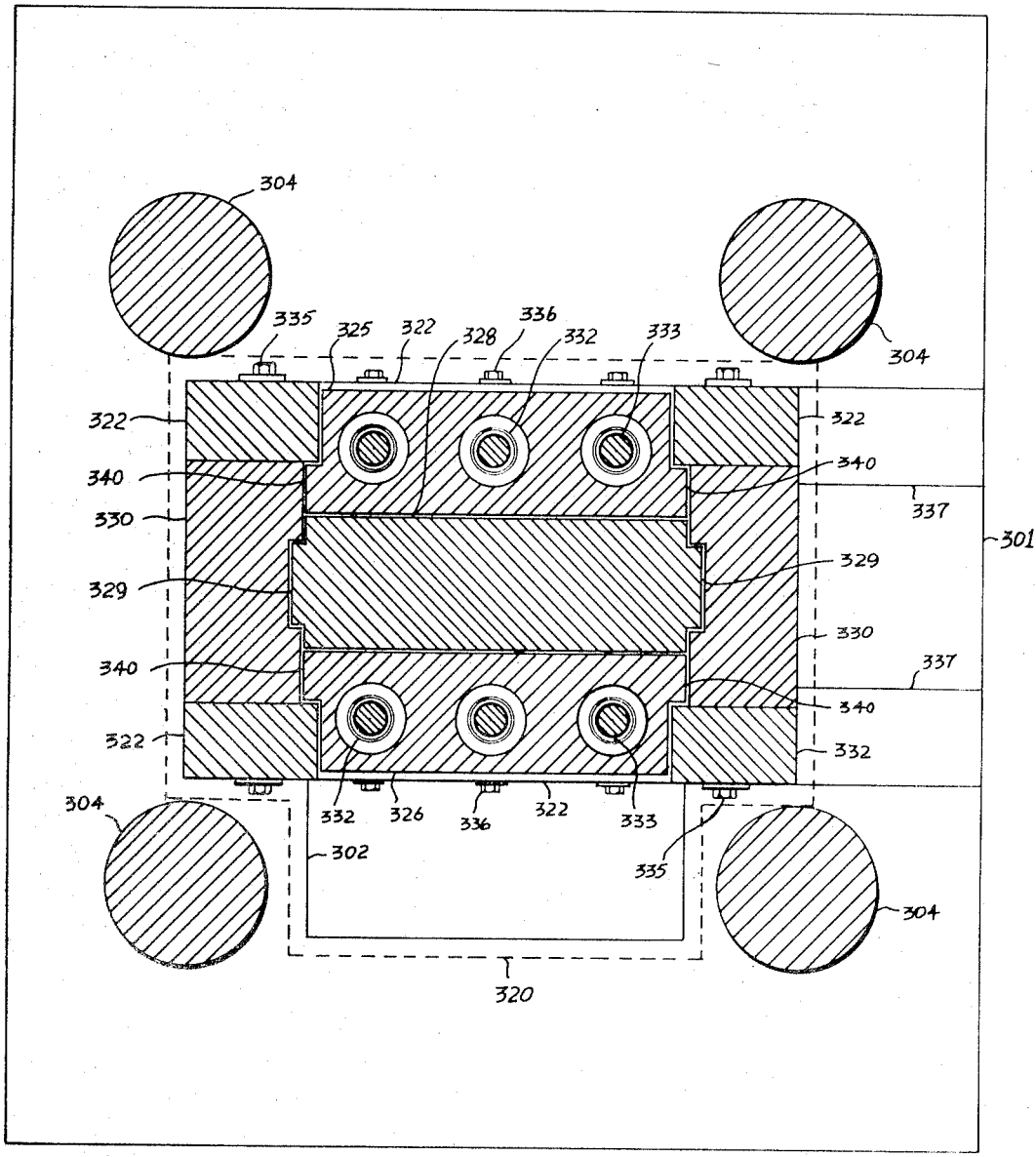
FIG. 17 is a horizontal cross-sectional view taken along line 17—17 in FIG. 15.

FIG. 17 shows a section through FIG. 15 taken on line 17—17. This figure is intended to further clarify the operation of the shear and the means by which drive member 328 and rod clamps 325 and 326 are guided during shear operation. As seen in FIG. 17 these moving elements move upwardly and downwardly within a fixed frame 322 which includes center section 330. Bolts 335 maintain fixed frame 322 and center sections 330 in rigid alignment permitting drive member 328 and rod clamps to move only in a vertical direction. Transverse movement of drive member 328 is prevented by guide rails 329 extending from the ends of drive member 328. Transverse movement of rod clamps 325 and 326 is prevented by clamp guide portions 340 which interlock with fixed frame 322. As discussed above, the entire shear blade assembly and clamp assembly may be removed for repair and replacement by sliding fixed frame 322 to the right along shear guide rails 337, then lifting the entire sub-assembly away.

Preferably, the shear blade assembly is enclosed by a removable housing which surrounds the shear assembly within columns 304. This housing is not shown in FIGS. 15 and 16 since it would tend to obscure details of the shear assembly. However, a suitable location for this housing is indicated by broken line 320 in FIG. 17. This housing would enclose the shear assembly between base platen 301 and upper platen 305. An opening in this housing aligns with the rod exit opening in end housing 219 of the rod feed assembly as seen in FIG. 14. Suitable elastomeric gasket material would seal shear housing 320 against upper platen 305, base platen 301 and end housing 219 to prevent leakage of radioactive dust. Desirably, water spray nozzles (not shown) are mounted on the inside of shear housing 320 to wash radioactive dust from shear surfaces during shearing and before disassembly of the shear. The wash water with entrained dust passes downwardly through opening 302 and 303 with the cut fuel rod pieces 312.

Thus, it is seen that the shear assembly is a simple, rugged device, capable of rapidly shearing groups of fuel rods into small pieces. As with the other assemblies discussed above, the shear may be easily disassembled and repaired by conventional remote handling techniques.

System operation

The process of disassembling, handling and shearing fuel rods according to this invention preferably utilizes the above-described apparatus. As indicated above, various individual devices which make up the overall system may be modified as required in a specific situation. Further, some of the operations may be performed manually if desired. The following description of the overall process, however, emphasizes the preferred cooperative operation of the above-described sub-assemblies.

At the end of their useful life, fuel bundles are removed from the nuclear reactor and delivered to the reprocessing plant. The bundles, which contain appreciable amounts of residual fissionable fuel material and retain valuable fission products, are stored in a shielded area to await processing. The bundles are intensely radioactive at this time.

A fuel bundle is lifted by a handle at one end from the storage area by a conventional remotely operated crane and carried to clamp table 11 where fuel rod end securing means are removed. This is shown primarily in FIGS. 2, 3 and 4. The lower end of the fuel bundle is inserted into tilting bucket 52 and the bundle is swung down onto clamp table 11. Movable clamp bars 12 are actuated, clamping the fuel bundle against fixed clamp bars 30. The clamp engages only the bundle shroud and/or fuel rod spacers, leaving individual fuel rods free to move longitudinally of the bundle. The fuel rod end securing means, including lifting handle, upper tie plate, etc., are removed by conventional remote manipulators, using remotely operated wrenches, etc. If necessary, the ends of the fuel bundle may be cut off by abrasive saws within hoods 13. After the fuel rod end securing means have been removed, the individual rods are free to move longitudinally.

Rod pulling head 14 (as best shown in FIGS. 5 through 9) is then moved with carriage 15 so that the fuel rod engaging openings in pulling head 14 are adjacent the ends of the fuel rods in the clamped fuel bundle. These openings are then aligned with a first fuel rod or group of fuel rods by raising or lowering platform 100 by means of scissors jack 101 and by moving pulling head 14 to the left or right by means of screw 130, as necessary. Pulling head 14 is then moved into engagement with the fuel rods and clamp lever 141 is actuated to clamp onto the fuel rods.

Carriage 15 is moved away from the fuel bundle along guide rails 16 and 17, pulling the clamped fuel rods from the bundle. Fuel rod supports 143 automatically swing up to support the withdrawing fuel rods.

When the rods are fully withdrawn from the bundle, clamp lever 141 is disengaged, ejector pins 188 eject the rods, and actuating cylinder 150 is operated to cause rod suports 143 to lower the fuel rods onto receiving table 18.

Holding table 19 is then pivoted by actuating cylinders 162 so that rod transfer bars 159 rise up under the fuel rods on receiving table 18 and causes them to slide and roll over onto holding table 19.

Carriage 15 is then again moved toward the fuel bundle to pull additional fuel rods. Rod pusher 20 is held above the fuel rods on holding table 19 by actuating cylinder 166 during this movement.

Further rods are withdrawn from the fuel bundle until the desired number have accumulated on holding table 19. Then hydraulic cylinder 166 is actuated to lower rod pusher 20 so that it lies on holding table 158 behind the group of fuel rods. When carriage 15 next moves towards the fuel bundle, pusher 20 pushes the fuel rods through door 208 into housing 200. Pusher 20 retracts as carriage 15 moves back as rod pulling head 14 pulls additional fuel rods from the bundle. Carriage 15 is again moved back and forth, gradually loading holding table 19 with another set of fuel rods.

Meanwhile, as best shown in FIGS. 10 through 14, rod pusher 226 is moved up into engagement with the fuel rods in feed housing 200. The operator actuates drive 210 to move the fuel rods the desired distance into the shear.

Shear hydraulic cylinder 25 is actuated, as best seen in FIGS. 15, 16 and 17, to drive ram 312 downwardly. Rod clamps 325 and 326 engage the fuel rods, then moving shear blade 327 passes downwardly, simultaneously making two cuts through each rod. Ram 312 is withdrawn and the cut-off portions of the fuel rods drop down into a container for further processing.

The fuel rods are again advanced, and further pieces are cut off. It is generally undesirable that the final cuts at the pusher engaging end of the rods be very short, since pusher 226 might inadvertently enter the shearing area. Therefore, the operator will observe the position of indicator 211 and make such necessary short cuts early, so that the final cuts at the end of the rods are of the full standard length. Tilting table 273 and washers 269 and 270 insure that the short pieces near the end of the fuel rod maintain their proper alignment and feed smoothly into the shear.

After the entire set of fuel rods have passed through the shear, pusher 20 is retracted back to a position well below flap 234, door 208 is opened and another group of fuel rods is pushed into housing 200.

The above-described system may be operated manually, with an operator viewing the system either through shielded windows or by closed-circuit television. However, this system is easily adapted to highly automated operation. The various individual operations of the rod pulling assembly may be controlled by means of conventional micro-switches and servo-mechanisms. An operator may be located at a console in a remote location, viewing a graphic display panel showing the positions of the fuel rods with respect to the various moving parts, carriages, etc., by means of conventional servo-mechanisms which operate the devices and provide a feed back signal into the graphic display.

Although specific proportions and arrangements have been described in the above description of a preferred embodiment, these may be varied within the scope of this disclosure, depending upon specific conditions, with similar results. For example, the various drive systems and actuating cylinders may be modified and automated as desired.

Other modifications and ramifications of the invention will become apparent to those skilled in the art upon reading the present diclosure. These are intended to be included within the scope of this invention.

I claim:

1. In a nuclear fuel recovery plant, a means for disassembling fuel bundles and shearing fuel rods comprising in combination:

(a) nuclear fuel rod bundle handling means for holding a fuel bundle in a fixed position while permitting longitudinal movement of the fuel rods therein;
(b) nuclear fuel rod bundle disassembly means to grasp and pull fuel rods from said bundle;
(c) holding means to collect said rods in parallel alignment;
(d) feed means to feed groups of fuel rods to a shear means; and
(e) shear means to handle and cut said rods into short pieces.

2. The combination according to claim 1 further including means associated with said nuclear fuel rod bundle handling means to remove fuel rod end securing means from said fuel rods.

3. The combination according to claim 1 wherein said nuclear fuel rod bundle disassembly means further includes means to support said fuel rods during withdrawal of said fuel rods from said bundle; means to lower said fuel rods to a receiving table after withdrawal is completed; and means to transfer said fuel rods from said receiving table to said holding means for accumulation.

4. The combination according to claim 1 wherein said holding means further includes means to deliver groups of fuel rods to said feed means after the desired number of fuel rods have accumulated in said holding means.

5. The combination according to claim 1 wherein said feed means further includes external indicator means to indicate the position of the end of a group of fuel rods being fed.

6. The combination according to claim 1 wherein said shear means includes a single double-edged moving shear blade and two stationary shear blades and is adapted to simultaneously cut two short pieces from the end of each fuel rod.

7. A feed means device for handling and shearing nuclear fuel rods comprising:
(a) a housing surrounding a support means which includes a plurality of parallel rollers permitting axial movement of fuel rods thereover;
(b) driven pusher means to move said fuel rods axially over said support and into a shear means;
(c) a dust tight removable cover means on said housing enclosing the support means;
(d) means for removing radioactive dust from the housing; and
(e) shear means comprising a single double-edged moving shear blade cooperating with two stationary shear blades adapted to simultaneously cut two short pieces from the end of each fuel rod.

8. The device of claim 7 in which the means for removing radioactive dust from within the housing comprises spray means adapted to wash away radioactive dust from within said housing and cover.

9. The device of claim 8 further including indicator means external to said housing and cover indicating the position of the end of said fuel rods in engagement with said pusher means.

10. The device of claim 8 wherein said cover is secured to said housing by remotely operable means whereby said cover may be remotely released and removed.

11. The device of claim 7 wherein said support means is mounted in said housing on guide means permitting remote removal of said support means from said housing.

12. The device of claim 7 wherein said moving shear blade is secured to said shear means by slidably engaging members, whereby said moving shear blade may be remotely removed.

13. The device of claim 7 wherein said shear means further includes a pair of clamp members which move with said moving shear blades, engaging and clamping said fuel rod against said fixed shear blades during shearing.

14. A process for preparing irradiated nuclear fuel rod bundles for fuel reprocessing comprising the steps of:

(a) clamping said bundle so that the fuel rod supports are fixed but said fuel rods are free to be moved axially;
(b) removing fuel rod end securing means;
(c) pulling fuel rods axially from said bundle;
(d) collecting groups of rods as a single layer parallel contiguous array;
(e) feeding groups of fuel rods incrementally into a shear; and
(f) shearing said fuel rods into small pieces.

15. The process according to claim 14 wherein said fuel rod end securing means are removed by sawing the ends from said bundle.

16. The process according to claim 14 wherein said shearing includes the steps of clamping said fuel rods against two spaced stationary shear blades and passing a double-edged moving shear blade therebetween to simultaneously cut two pieces from the end of each fuel rod.

17. The process according to claim 14 wherein said fuel rods are pulled from said fuel rod bundle by:
(a) aligning in three dimensions at least one fuel rod end receiving opening in a puller head with at least one fuel rod in said bundle;
(b) clamping said fuel rod in said opening;
(c) moving said puller head axially away from said bundle to pull said rod from said bundle; and
(d) releasing said rod from said puller head after withdrawal is complete.

18. The process according to claim 17 further including the steps of supporting said fuel rods in substantially straight configuration during withdrawal and lowering said fuel rods to a receiving table after release by said puller head.

19. The process according to claim 18 wherein groups of fuel rods are collected by transferring rods from said receiving table to a holding table and accumulating them on said holding table.

20. The combination according to claim 1 wherein the nuclear fuel rod bundle handling means is a clamp table.

21. The combination according to claim 20 wherein the clamp table has movable clamp means.

22. The combination according to claim 1 wherein the nuclear fuel rod bundle disassembly means is a rod pulling assembly.

23. The combination according to claim 1 wherein the shear means is a single double-edged moving shear blade cooperating with two stationery shear blades adapted to simultaneously cut two short pieces from the end of each fuel rod.

24. The combination according to claim 1 wherein the holding means is a table.

25. The device of claim 7 further including a housing surrounding the shear means and tightly abutting the housing surrounding the support means, each housing having openings for movement of fuel rods therethrough.

26. The device of claim 8 in which the housing has a header filled with water feeding the spray means.

27. The device of claim 10 wherein the remotely operable means are clamps.

References Cited
UNITED STATES PATENTS

| | | | |
|---|---|---|---|
| 2,065,420 | 12/1936 | Bennett | 83—207 |
| 3,039,343 | 6/1962 | Richards | 83—694 |
| 3,225,632 | 12/1965 | Remund | 83—926 X |
| 3,276,307 | 10/1966 | Williamson | 83—923 X |
| 3,366,716 | 1/1968 | Cohen | 83—170 X |
| 3,452,632 | 7/1969 | Brolund | 83—701 X |
| 3,466,958 | 9/1969 | Munson | 83—207 |

JAMES M. MEISTER, Primary Examiner

U.S. Cl. X.R.

83—98, 104, 169, 278, 281, 282, 620, 925

UNITED STATES PATENT OFFICE
CERTIFICATE OF CORRECTION

Patent No. 3,621,742      Dated November 23, 1971

Inventor(s) Wyvil R. Kendall

It is certified that error appears in the above-identified patent and that said Letters Patent are hereby corrected as shown below:

Column 5, line 14, "uclamped" should be --unclamped--. Column 9, line 8, "radio-active" should be one word, not hyphenated; line 25, "radio-active" should be one word, not hyphenated; and line 32, after "such" insert --as--.

Signed and sealed this 4th day of July 1972.

(SEAL)
Attest:

EDWARD M. FLETCHER, JR.
Attesting Officer

ROBERT GOTTSCHALK
Commissioner of Patents